(12) United States Patent
Gustavsson et al.

(10) Patent No.: US 11,607,640 B2
(45) Date of Patent: Mar. 21, 2023

(54) SEPARATOR, SEPARATOR SYSTEM AND METHODS OF THEIR OPERATION

(71) Applicant: HUSQVARNA AB, Huskvarna (SE)

(72) Inventors: Daniel Gustavsson, Söderköping (SE); Andreas Fogelberg, Söderköping (SE)

(73) Assignee: HUSQVARNA AB, Huskvarna (SE)

( * ) Notice: Subject to any disclaimer, the term of this patent is extended or adjusted under 35 U.S.C. 154(b) by 96 days.

(21) Appl. No.: 16/643,738

(22) PCT Filed: Sep. 5, 2018

(86) PCT No.: PCT/SE2018/050887
§ 371 (c)(1),
(2) Date: Mar. 2, 2020

(87) PCT Pub. No.: WO2019/050455
PCT Pub. Date: Mar. 14, 2019

(65) Prior Publication Data
US 2020/0269182 A1   Aug. 27, 2020

(30) Foreign Application Priority Data
Sep. 5, 2017   (SE) .................................. 1751070-2

(51) Int. Cl.
*B04B 13/00*   (2006.01)
*B01D 50/20*   (2022.01)
(Continued)

(52) U.S. Cl.
CPC ......... *B01D 50/20* (2022.01); *B01D 46/0086* (2013.01); *B04B 13/00* (2013.01);
(Continued)

(58) Field of Classification Search
CPC ...... B01D 46/46; B01D 45/12; B01D 46/444; B01D 46/446; B01D 50/002; B01D 46/90;
(Continued)

(56) References Cited

U.S. PATENT DOCUMENTS 3,469,566 A * 9/1969 Wilkinson ........... F02M 35/022
55/467
4,221,576 A * 9/1980 Phillips, Jr. ............ B01D 46/20
55/352

(Continued)

FOREIGN PATENT DOCUMENTS

CA       2877513 A1 * 2/2014  ............ F04C 13/001
CN       101370416 A    2/2009
(Continued)

OTHER PUBLICATIONS

Swedish Search Report for Application No. 1751070-2 dated Feb. 21, 2018.
(Continued)

*Primary Examiner* — Dung H Bui
(74) *Attorney, Agent, or Firm* — Burr & Forman LLP

(57) ABSTRACT

The present disclosure provides a method of operating a separator (1,1*a*, 1*b*) for separating particles from a particle-laden airflow. The method comprises receiving, in the controller (18), a separation unit status signal from the separation unit status sensor (16*a*, 16*b*, 16*c*, 16*d*), deriving, in the controller (18), separator status data based on the separation unit status signal, communicating, via the communication device (19), the separator status data to the external unit (1*a*, 1*b*, 26), receiving, via the communication device (19), incoming control data from the external unit (1*a*, 1*b*, 26), determining, in the controller (18), based on the separator status data and based on the incoming control data, whether to initiate separating unit maintenance, and selectively ini-
(Continued)

tiating separating unit maintenance based on said determination. The disclosure also provides a separator for implementing the method and a system comprising two or more such separators.

8 Claims, 4 Drawing Sheets

(51) Int. Cl.
    *B01D 46/00*                (2022.01)
    *B24B 7/18*                 (2006.01)
    *B24B 55/10*              (2006.01)

(52) U.S. Cl.
    CPC ........... *B04B 2013/006* (2013.01); *B24B 7/18* (2013.01); *B24B 55/102* (2013.01)

(58) Field of Classification Search
    CPC ......... B24B 7/18; B24B 55/102; B24B 55/06; B24B 55/10; B04C 2009/002; B04C 9/00; B04C 11/00; B04B 13/00; B04B 2013/006; B23Q 11/0046; A47L 7/0095
    See application file for complete search history.

(56) References Cited

U.S. PATENT DOCUMENTS

| | | | | |
|---|---|---|---|---|
| 4,667,264 | A * | 5/1987 | Yamazaki | H02H 11/004 361/77 |
| 5,064,454 | A * | 11/1991 | Pittman | B01D 46/90 55/467 |
| 5,236,477 | A * | 8/1993 | Koketsu | B01D 46/46 236/94 |
| 5,242,474 | A * | 9/1993 | Herbst | A61B 18/00 96/397 |
| 5,271,751 | A | 12/1993 | Lagler | |
| 5,311,066 | A * | 5/1994 | Malloy | H02J 3/44 307/87 |
| 6,120,583 | A * | 9/2000 | Saito | F01N 3/027 95/278 |
| 6,161,250 | A | 12/2000 | Young et al. | |
| 6,203,859 | B1 * | 3/2001 | Scheufler | B05B 14/43 427/475 |
| 6,239,694 | B1 * | 5/2001 | Honda | B01D 46/46 340/457 |
| 6,402,822 | B1 * | 6/2002 | Najm | B01D 46/446 96/429 |
| 6,423,118 | B1 * | 7/2002 | Becerra | B01D 46/46 96/417 |
| 6,596,059 | B1 * | 7/2003 | Greist | B01D 46/18 96/417 |
| 6,632,269 | B1 * | 10/2003 | Najm | B01D 46/20 55/501 |
| 7,282,074 | B1 * | 10/2007 | Witter | B24B 55/06 451/87 |
| 7,611,556 | B2 * | 11/2009 | Borinato | B23Q 11/0046 55/385.1 |
| 8,597,391 | B1 * | 12/2013 | Dietz | B01D 46/2403 55/485 |
| 8,679,236 | B1 * | 3/2014 | Dietz | B01D 46/26 95/287 |
| 9,702,577 | B1 * | 7/2017 | Lachapelle | F24F 11/0001 |
| 10,363,510 | B1 * | 7/2019 | Karas | B01D 46/0086 |
| 10,507,422 | B2 * | 12/2019 | Combs | F24F 11/0001 |
| 10,774,846 | B2 * | 9/2020 | Hur | B01D 46/403 |
| 11,192,056 | B1 * | 12/2021 | Castaneda | B01D 46/46 |
| 2002/0066372 | A1 * | 6/2002 | White | B01D 46/0086 55/385.6 |
| 2002/0078830 | A1 * | 6/2002 | Chung | B01D 46/46 96/424 |
| 2004/0087426 | A1 * | 5/2004 | Lattanzi | B04B 5/0421 494/20 |
| 2004/0200271 | A1 * | 10/2004 | van Nieuwstadt | F01N 13/009 73/114.78 |
| 2005/0150199 | A1 | 7/2005 | Michele et al. | |
| 2005/0150382 | A1 * | 7/2005 | Sheehan | B01D 46/22 96/429 |
| 2006/0100796 | A1 * | 5/2006 | Fraden | A47L 9/19 702/50 |
| 2006/0249023 | A1 * | 11/2006 | Pranda | B01D 46/70 95/273 |
| 2007/0012181 | A1 * | 1/2007 | Niezgoda | B01D 46/0086 95/1 |
| 2007/0101688 | A1 * | 5/2007 | Wootton | B01D 46/0036 55/385.2 |
| 2007/0157819 | A1 * | 7/2007 | Kang | B01D 46/0086 96/417 |
| 2007/0251221 | A1 * | 11/2007 | Lueschow | G01N 29/223 60/297 |
| 2008/0202781 | A1 * | 8/2008 | Nishikawa | B23Q 11/0071 408/124 |
| 2008/0229720 | A1 * | 9/2008 | Benscoter | B01D 46/446 55/385.3 |
| 2009/0031684 | A1 * | 2/2009 | Ragona | B01D 46/46 55/383 |
| 2009/0211455 | A1 * | 8/2009 | Gunther | B01D 46/0086 96/407 |
| 2010/0095656 | A1 * | 4/2010 | Kamiya | F01N 3/0253 60/287 |
| 2010/0101409 | A1 * | 4/2010 | Bromberg | B01D 46/44 96/397 |
| 2010/0261595 | A1 * | 10/2010 | Schaefer | B04B 5/0421 494/20 |
| 2010/0306955 | A1 * | 12/2010 | Menrik | B04C 5/14 15/347 |
| 2010/0313748 | A1 * | 12/2010 | Schluter | B01D 46/46 95/25 |
| 2011/0011067 | A1 * | 1/2011 | Ren | F01N 3/2066 60/297 |
| 2011/0023709 | A1 * | 2/2011 | Bosshard | B01D 46/442 96/417 |
| 2011/0072782 | A1 * | 3/2011 | Ozawa | B01D 46/46 60/273 |
| 2011/0094297 | A1 * | 4/2011 | Guzman | F02M 35/024 73/114.31 |
| 2011/0197760 | A1 * | 8/2011 | Lindau | B01D 53/0454 96/111 |
| 2011/0277441 | A1 * | 11/2011 | Ayshford | B01D 46/0086 55/480 |
| 2012/0047856 | A1 * | 3/2012 | Khami | F02M 35/0203 55/385.3 |
| 2012/0079814 | A1 * | 4/2012 | Blomquist | F01N 13/011 60/278 |
| 2012/0160094 | A1 * | 6/2012 | Manahan | B01D 46/46 55/482 |
| 2012/0260687 | A1 * | 10/2012 | Inaniwa | B04B 9/10 62/196.1 |
| 2013/0239802 | A1 * | 9/2013 | Troxell | B01D 46/0086 95/20 |
| 2013/0276629 | A1 * | 10/2013 | Salahshour | B01D 46/0086 96/419 |
| 2014/0059983 | A1 | 3/2014 | Ho | |
| 2014/0209074 | A1 * | 7/2014 | Kahle | F16L 37/088 123/572 |
| 2014/0238284 | A1 * | 8/2014 | Kapphahn | A01C 15/04 111/174 |
| 2014/0260994 | A1 * | 9/2014 | Grider | B01D 46/0041 96/399 |
| 2014/0366721 | A1 * | 12/2014 | Roy | B01D 46/444 95/22 |
| 2015/0075373 | A1 * | 3/2015 | Miller | B01D 46/0032 96/400 |
| 2015/0112246 | A1 * | 4/2015 | Palmerton | A61M 13/003 96/400 |
| 2015/0151447 | A1 * | 6/2015 | Petersson | B23B 45/02 30/381 |
| 2015/0157972 | A1 * | 6/2015 | Bratten | B01D 46/003 95/22 |

(56) References Cited

U.S. PATENT DOCUMENTS

| | | | | |
|---|---|---|---|---|
| 2015/0238888 A1* | 8/2015 | Comeau | ............... | B01D 46/71 96/417 |
| 2015/0266305 A1* | 9/2015 | Gasso Puchal | ........ | B41J 2/1714 96/400 |
| 2015/0306533 A1* | 10/2015 | Matlin | ............... | F24F 8/10 96/417 |
| 2015/0345439 A1* | 12/2015 | Gomez | ............... | B01D 50/002 123/184.21 |
| 2016/0100724 A1* | 4/2016 | Valentini | ............... | A47L 9/2836 15/319 |
| 2016/0121254 A1* | 5/2016 | Bohrer | ............... | B01D 46/0086 96/400 |
| 2016/0243486 A1* | 8/2016 | Galsim | ............... | F24F 13/28 |
| 2017/0095762 A1* | 4/2017 | Wolowicz | ............... | B01D 46/446 |
| 2017/0189846 A1* | 7/2017 | Cho | ............... | B01D 46/0086 |
| 2017/0211452 A1* | 7/2017 | Imai | ............... | F01N 3/021 |
| 2017/0234534 A1* | 8/2017 | Donahue | ............... | F02M 33/00 60/274 |
| 2017/0241656 A1* | 8/2017 | Fox | ............... | B01D 46/10 |
| 2017/0306788 A1* | 10/2017 | Vega | ............... | F01D 21/003 |
| 2017/0363111 A1* | 12/2017 | Hur | ............... | F04D 25/166 |
| 2018/0045206 A1* | 2/2018 | Birk | ............... | B01D 46/46 |
| 2018/0073386 A1* | 3/2018 | Zhang | ............... | B01D 46/88 |
| 2018/0140989 A1* | 5/2018 | Arthur | ............... | B01D 46/521 |
| 2018/0209890 A1* | 7/2018 | Case | ............... | B01D 46/0086 |
| 2018/0229173 A1* | 8/2018 | Weinbrenner | ....... | B01D 46/448 |
| 2018/0244034 A1* | 8/2018 | Sutcliffe | ............... | B22F 10/77 |
| 2018/0304189 A1* | 10/2018 | Whittington | ........... | B01D 50/60 |
| 2018/0312025 A1* | 11/2018 | Danielson | ............ | B60K 17/344 |
| 2018/0333667 A1* | 11/2018 | Maranville | ........ | B01D 46/0045 |
| 2019/0001250 A1* | 1/2019 | Moredock | ............ | B60H 1/00264 |
| 2019/0030476 A1* | 1/2019 | Fanning | ............... | B01D 46/446 |
| 2019/0041079 A1* | 2/2019 | Kohn | ............... | F24F 11/30 |
| 2019/0076771 A1* | 3/2019 | Baxter | ............... | B01D 46/71 |
| 2019/0117030 A1* | 4/2019 | Kette | ............... | B01D 46/46 |
| 2019/0183304 A1* | 6/2019 | Yuen | ............... | A47L 9/122 |
| 2019/0209957 A1* | 7/2019 | Silvestro | ............... | B01D 46/70 |
| 2019/0225525 A1* | 7/2019 | Fayerweather | ......... | C03B 3/023 |
| 2019/0262750 A1* | 8/2019 | Key | ............... | B01D 35/1435 |
| 2019/0291034 A1* | 9/2019 | Micozzi | ............. | B01D 46/2411 |
| 2020/0078720 A1* | 3/2020 | Nilsson | ............... | B01D 46/023 |
| 2020/0155993 A1* | 5/2020 | Wunderlich | ........... | F01N 11/00 |
| 2020/0256578 A1* | 8/2020 | Meis | ............... | B01D 46/00 |
| 2021/0114113 A1* | 4/2021 | Yasbek | ............... | B33Y 30/00 |

FOREIGN PATENT DOCUMENTS

| | | | | |
|---|---|---|---|---|
| CN | 202237529 U | | 5/2012 | |
| CN | 105999827 A | | 10/2016 | |
| CN | 107684783 A | * | 2/2018 | .......... B01D 46/446 |
| EP | 0478966 A2 | * | 4/1992 | ............... H02J 3/38 |
| EP | 615718 A1 | | 9/1994 | |
| EP | 951230 B1 | | 6/2002 | |
| EP | 1679156 A1 | | 7/2006 | |
| EP | 1978859 A1 | | 10/2008 | |
| EP | 3293367 A1 | * | 3/2018 | .......... B01D 46/446 |
| GB | 2320419 A | | 6/1998 | |
| GB | 2353314 A | | 2/2001 | |
| JP | 56133254 U | * | 10/1981 | |
| JP | H05184835 A | | 7/1993 | |
| JP | 2004-106163 A | | 4/2004 | |
| WO | 2007/080185 A1 | | 7/2007 | |
| WO | 2007083844 A1 | | 7/2007 | |
| WO | WO-2016084022 A1 | * | 6/2016 | ............. B04B 13/00 |
| WO | WO-2018029573 A1 | * | 2/2018 | ............. B04C 11/00 |

OTHER PUBLICATIONS

International Search Report and Written Opinion for International Application No. PCT/SE2018/050887 dated Oct. 8, 2018.

International Preliminary Report on Patentability for International Application No. PCT/SE2018/050887 dated Mar. 10, 2020.

* cited by examiner

SEPARATOR, SEPARATOR SYSTEM AND METHODS OF THEIR OPERATION

TECHNICAL FIELD

The present disclosure relates to a separator for separating particles, such as dust and small debris, from a particle-laden air flow.

Such separators find particular application in construction, renovation and demolition settings, where dust and small debris are generated.

A particular application is the cutting, grinding and/or polishing of floor surfaces of stone or stone-like materials, including concrete and terrazzo floors. A related application is the removal of coatings on floors, such as epoxy, vinyl floorings or glue.

BACKGROUND

A separator typically comprises a drive motor connected to an impeller, which causes an airflow. The airflow is drawn through a separation unit, which may comprise one or more centrifugal separators and/or filters. The drive motor is typically an electric motor.

When a separator is being operated, particles may accumulate in the separation unit in such a way that the capacity of the separation unit may deteriorate. For example, a filter may be clogged, such that a pressure drop over the filter will increase, thus reducing the separator's ability to properly extract particles from the source of particles.

This is a particular problem in heavy duty applications, such as floor grinding, where large amounts of particles to be separated are generated.

Hence, the separator unit will from time to time need to be cleaned. Such cleaning may imply a filter change or a filter cleaning.

However, in order to change or clean the filter, the separator's operation must be interrupted for the time necessary to perform the change or cleaning operation. In many applications, even a very short downtime of the separator will force the source operation (e.g. floor grinding) to halt as well, as otherwise too much particles would accumulate at the source, with potential damage to the work piece or occupational hazard ensuing.

Moreover, the operator, especially when working alone, may have to interrupt the work with the floor grinding in order to check on the separator.

One solution is provided by WO07080185A1. This system involves separator having dual separation units, where one of the separation units can be cleaned while the other one remains operational.

However, such a dual separator, by necessity, becomes bulky and costly to manufacture.

Hence, there is a need for a separator which is able to reduce or eliminate maintenance downtime.

SUMMARY

An object of the present disclosure is to provide a separator, having reduced or eliminated downtime for separation unit maintenance.

The invention is defined by the appended independent claims, with embodiments being set forth in the attached dependent claims, in the following description and in the attached drawings.

According to a first aspect, there is provided a method of operating a separator for separating particles from a particle-laden airflow. The separator comprises an inlet for the particle-laden airflow, the inlet comprising a hose connection, a separation unit, a motor, configured to draw the particle-laden airflow from the inlet and through the separation unit, at least one separation unit status sensor, a controller, operatively connected to the electric motor and to the separation unit status sensor, and a communication device, operatively connected to the controller for communication with at least one unit external to the separator.

The method comprises receiving, in the controller, a separation unit status signal from the separation unit status sensor, deriving, in the controller, separator status data based on the separation unit status signal, communicating, via the communication device, the separator status data to the external unit, receiving, via the communication device, incoming control data from the external unit, determining, in the controller, based on the separator status data and based on the incoming control data, whether to initiate separating unit maintenance, and selectively initiating separating unit maintenance based on said determination.

A separating unit may be any type of device for separating particles from an airflow. Non-limiting examples include centrifugal separators and filters.

The motor may be any type of motor, preferably an electric motor, most preferably an asynchronous electric motor.

The separation unit status sensor may be any sensor or group of sensors that is capable of generating an indication of a separation unit status. For example, the sensor may include one or more pressure sensors, one or more flow sensors and/or one or more particle sensors.

The controller may be anything from a dedicated machine controller to a general purpose programmable controller.

The communication device may be a separate device, or it may be integrated with The communication device may operate based on a wired interface. However, it would be preferred if it operates wirelessly, such as via infrared or RF. A standard interface, such as Wi-Fi, Bluetooth or wireless CAN may be used. Alternatively, a custom made wireless interface and protocol may be used.

The separation unit status signal may be an analog signal directly from the sensor element, or a signal that has been preprocessed and optionally digitized. For example, the signal may be a digital value indicating an absolute or relative value of the measured parameter in standard units.

Deriving separator status data may comprise using the value received as is, or one or more pre-processing and/or evaluation steps. For example, the separation unit status data may be derived by classifying the value represented by the status signal into one of two or more classes.

It is also noted that values from multiple sensors may be received and used in deriving the separation unit status data. For example, a value indicating a pressure difference may be classified as "no need for maintenance", "maintenance when convenient" or "immediate maintenance".

"Incoming control data" may include any type of data that may affect the decision to initiate maintenance. For example, the control data may include separator status data from another separator, it may include a control command to initiate maintenance, or it may include a control command to prevent initiation of maintenance.

By "selectively initiating separating unit maintenance" is meant that the decision to initiate maintenance is taken based on the determination whether to initiate maintenance or not.

A separator as discussed above may be used alone, or it may be used in a system comprising at least one further separator that is connected to the same source of dust. Since the separator is capable of sending status data and receiving control data, it is possible for the separator to coordinate its operation with the other separator, such that the separator group can provide continuous operation.

Hence, it is possible to make each separator small enough to, e.g. pass through doors or other openings to spaces where they are to be used, and to be handled conveniently by an operator, while still, when combined with one or more further separators, being able to deliver very high capacity, continuous, separation of particles.

The separator status data may comprise one of an indication that separating unit maintenance is imminent, an indication that separating unit maintenance is in progress, and an indication that no separating unit maintenance is imminent.

The incoming control data may comprise one of an indication that the separator is allowed to initiate separating unit maintenance, an indication that triggers separating unit maintenance, and an indication that separating unit maintenance must not be initiated.

The method may further comprise receiving motor status data, wherein the separator status data comprises the motor status data.

The incoming control data may comprise motor status data of another separator, and wherein the method further comprises controlling the motor based on the motor status data.

The method may further comprise generating, in the controller, junction valve control data, and sending, via the communication device, the junction control data to an airflow junction valve controller.

According to a second aspect, there is provided a separator for separating particles from a particle-laden airflow, comprising an inlet for the particle-laden airflow, the inlet comprising a hose connection, a separation unit, a motor, configured to draw the particle-laden airflow from the inlet and through separation unit, at least one separation unit status sensor, and a controller, operatively connected to the electric motor and to the separation unit status sensor. The separator further comprises a communication device, operatively connected to the controller for communication with at least one unit external to the separator.

The motor of the separator may be an asynchronous electric motor, which may operate at three phases. Typically, the electric motor may operate at 3-10 kW, preferably 4-8 kW and provide an airflow of about 300-1000 m$^3$/h, preferably 300-700 m$^3$/h.

The hose connection may be any type of hose connector, but preferably of a size exceeding 2 inches, more preferably 3-4 inches.

A standardized hose connector, such as the Camlock standard, may be used.

The same sort of hose connector may be used on the grinding machine. Optionally, the hose connectors of the grinding machine and on the separator may be of the same size but male and female. As another option, the hose connectors on the grinding machine and on the separator may be both male or both female.

The communication device may be integrated with the controller, or it may be provided as a separate device which is operatively connected to the controller.

The separator may further comprise a frame, supporting the separation unit, the motor, the controller and optionally the communication device.

The separation unit status sensor may comprise at least two sensors arranged on opposite sides of the separation unit.

According to a third aspect, there is provided a system comprising a source of particles to be collected, at least two separators as defined above, wherein the source of particles is connected to the separators by means of a junction, such that particles from the source can be selectively drawn by both separators.

The junction may be a non-regulated junction.

Alternatively, the junction may comprise at least one valve body, for regulating the flow to at least one of the separators.

The valve body may be configured as a non-return valve.

Preferably, there should be one non-return valve for each separator connection. Preferably, such non-return valve may be biased towards its closed position.

The communication devices of the separators may be configured to communicate with each other to exchange separator status data and/or control data.

The system may further comprise a central control unit, comprising a central communication device, wherein the communication devices of the separators are configured to communicate with the central communication device to exchange status data and/or control data.

The central control unit may be integrated with the source of particles.

The central control unit may be configured to receive the separator status data from the separators, determine which of the separators has the most imminent need for maintenance, and send control data including a maintenance trigger or a cleared for maintenance to that separator.

The central control unit may be configured to send a no maintenance signal to the other one of the separators.

The central control unit may be configured to receive status data from the separators, and present a combined status data to user.

The central control unit may be configured to receive an error message from one of the separators, and to present an indication of the error message, also indicating which separator it originated from, to a user.

According to a fourth aspect, there is provided a method of operating a system as described above, comprising sending separator status data from a first one of the separators via its communication device, receiving the separator status data in a second one of the separators via its associated communication device, and selectively initiating separator unit maintenance of the second separator based on the separator status data received from the first separator and based on separator status data associated with the second separator.

The separator status data of the first separator may comprise at least one of an indication that separating unit maintenance is imminent, an indication that separating unit maintenance is in progress, an indication that no separating unit maintenance is imminent, and motor status data.

DETAILED DESCRIPTION

Figure 1:
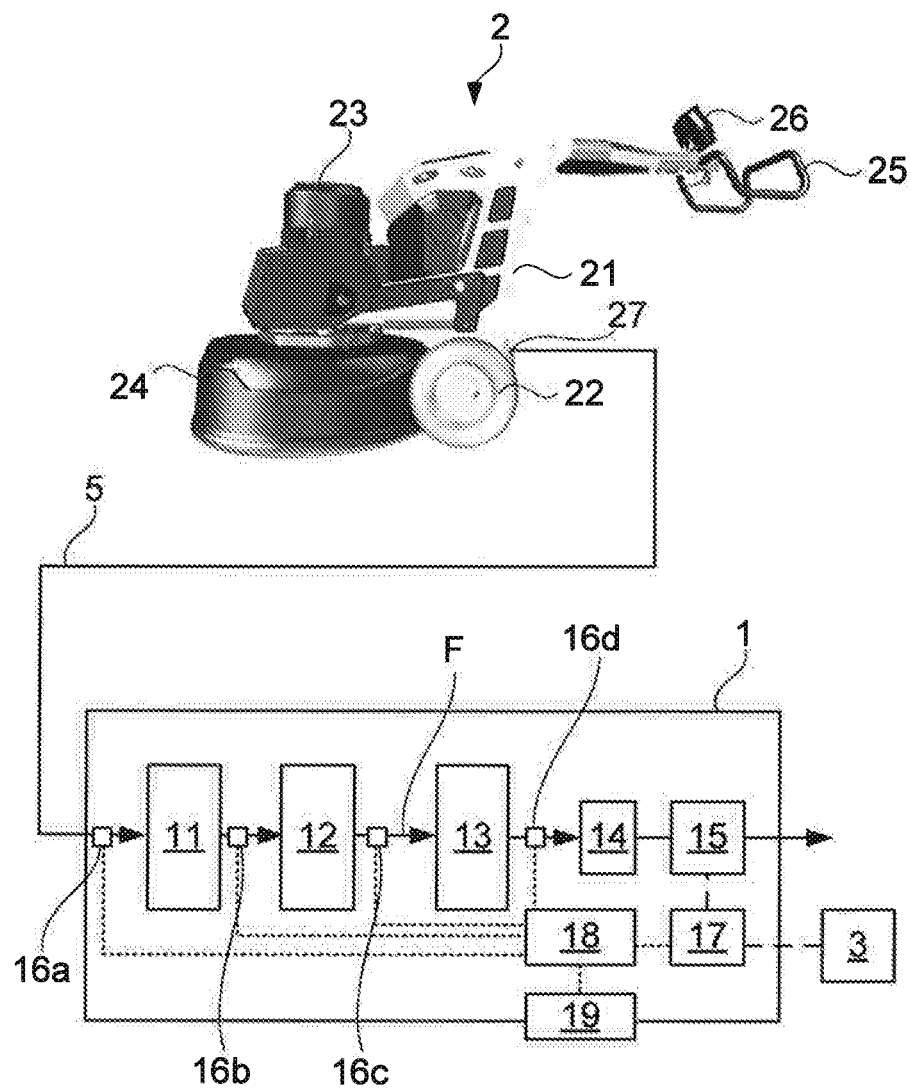
FIG. 1 is a schematic diagram illustrating a source of dust 2 and a separator 1.

FIG. 1 schematically illustrates separator 1, which is connected to a source of dust, such as a floor grinding machine 2.

The floor grinding machine 2 may comprise a frame 21 having support wheels 22, which may be driven, a motor 23, which is operatively connected to a rotatable grinding head (not shown) carrying a number of grinding tools for cutting, grinding or polishing of a floor surface. The grinding head may be housed in a casing 24, to prevent the dust/debris generated, as well as water that is sometimes supplied to cool tools or bind dust, from escaping to the ambient environment. The grinding machine 2 may further comprise a handle 25 to allow a user to maneuver the machine, and a user interface 26, through which information may be provided to the operator and control signals received from the operator.

A suction opening 27 is provided in the housing 24, through which the floor grinding machine is connected via a channel 5, such as a hose, to a flow path F of the separator 1.

Two or more of each separation unit 11, 12, 13 may be arranged in the flow path F.

Typically, the separator 1 comprises two or more separation units 11, 12, 13, arranged such that the larger particles are separated by the separation unit arranged 11 farthest upstream, and the remaining separation units 12, 13 separating increasingly finer particles from the airflow.

In the illustrated embodiment, the separator comprises a pre-separator 11, which may have the form of a centrifugal separator, a first filter 12, which may comprise a generally cylindrical filter body and a second filter 13, which may comprise a HEPA filter.

An impeller 14 is arranged in the flow path F in order to drive the airflow in the flow path F. An electric motor 15 is connected to the impeller, e.g. by an axle, a belt or a gear arrangement, so as to cause the impeller to rotate. The motor may be powered by an electric power supply 3, which may be a power grid or a generator. The power may be supplied via a power control device 17.

One or more pressure sensors 16a, 16b, 16c, 16d may be arranged in the flow path, to measure pressure.

A controller 18 may be connected to the pressure sensors 16a, 16b, 16c, 16d, to receive sensor signals, to the power control device 17 to control the motor, e.g. with respect to drive voltage, and optionally to receive motor status data, such as current rpm, voltages, power consumption, etc.

The separator 1 may further comprise a communication device 19, which may be integrated with the controller 18, or provided as a separate component.

The communication device 19 may operate based on a wired interface. However, it is preferred if it operates wirelessly, such as via infrared or RF. A standard interface, such as Wi-Fi, Bluetooth or wireless CAN may be used. Alternatively, a custom made wireless interface and protocol may be used.

The separator 1 operates by the motor 15 driving the impeller 14 so as to bring about an airflow in the flow path F. Typically, the motor will be arranged on a low pressure side of the separation units 11, 12, 13.

Figure 2:
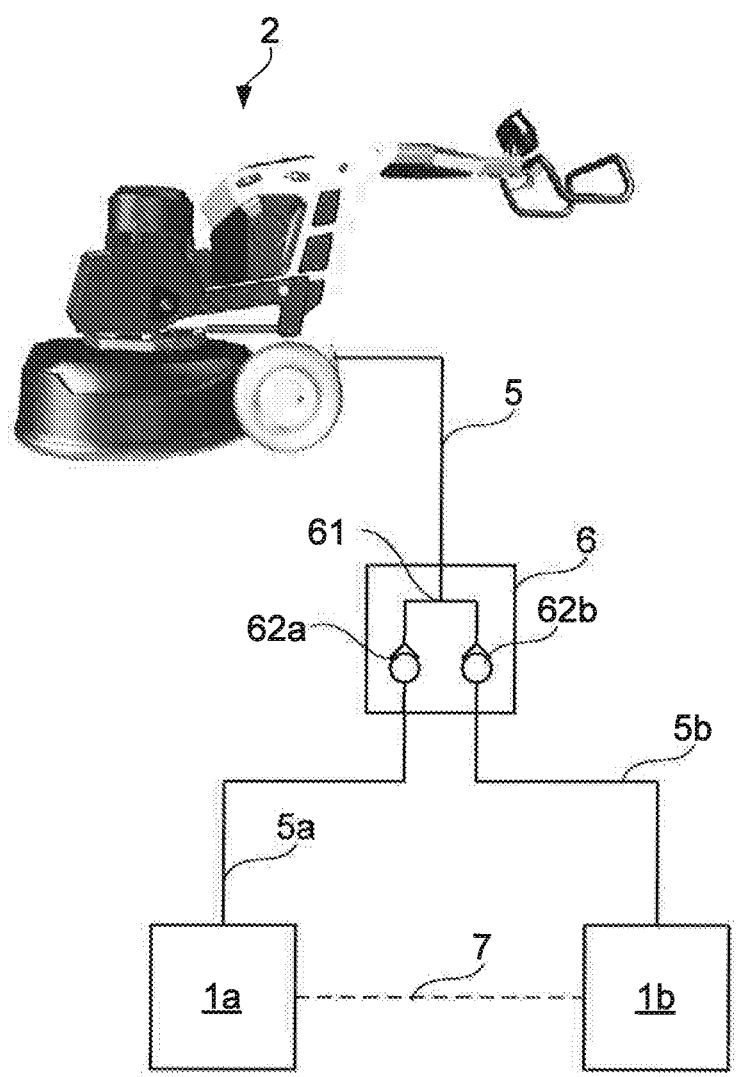
FIG. 2 is a schematic diagram illustrating a system comprising a source of dust 2 and a pair of separators 1a, 1b.

Referring to FIG. 2, there is disclosed a system in which the floor grinding machine 2 is connected to a pair of separators 1a, 1b, each of which may be configured as disclosed with reference to FIG. 1.

While it is possible to connect the separators 1a, 1b to the floor grinding machine 2 via a T- or Y-junction without valves or other control means, in the illustrated example, the junction device 6 comprises a channel junction 61 dividing the channel 5 from the floor grinder 2 into a pair of branch channels 5a, 5b leading to the respective separator 1a, 1b. In the junction device 6, each branch channel may be provided with a non-return valve, which may be biased towards its closed position, such that the channel 5a, 5b is closed when the associated separator 1a, 1b is not active.

As mentioned above, the separator 1, 1a, 1b comprises a communication device 19. This communication device may be used to provide a communication link 7 between the separators, such that the separators 1a, 1b may exchange data.

An example of a data exchange will be described below.

As mentioned above, the separator 1, 1a, 1b may comprise one or more sensors 16a, 16b, 16c, 16d, based on which filter status may be derived.

The controller 18 may thus receive data from the sensors. This data may be in analog or digital form. Based on the data, a status for one or more of the separation units 11, 12, 13 may be determined, such as maintenance needed ("yes" or "no") (which may be determined based on a pressure drop threshold), or remaining estimated life until maintenance (which may be estimated based on the pressure drop over the filter). Additional status data may include "not in service" (e.g. when the motor has been turned off), or "maintenance in progress" (when a maintenance program is executed).

In the case where pressure drop may be measured over two or more of the separation units 11, 12, 13, the status data may also indicate a status for each individual separation unit.

Based on the separation unit status, the controller 18 will determine whether to continue operation, or whether to initiate maintenance.

This separation unit status may be communicated by the first separator 1a via the communication device 19 and the communication link 7 to the second separator 1b, and vice versa.

Hence, not only will the controller 18 of the separator 1a determine whether to initiate maintenance based on its own separation unit status, but also based on the other separator's 1b separation unit status.

For example, if the other separator unit 1b is undergoing maintenance, or is otherwise not active, the first separator 1a will not initiate maintenance, and vice versa.

Likewise, if a need for maintenance is identified in the first separator 1a, e.g. based on the pressure drop exceeding a predetermined threshold, the decision to initiate maintenance may depend on whether the corresponding pressure drop in the other separator 1b is greater or smaller, i.e. on whether the other separator 1b has a more urgent need for maintenance.

Again, in the case where the separation units can be individually evaluated, it may be determined that a maintenance need for one of the separation units has higher priority than a maintenance need for another one of the separation units. Such prioritizations may be used as a basis for the controller's 18 decision.

Moreover, other types of status data for the separator 1a may be communicated via the communication link 7 to the other separator 1b, such as motor power or motor rpm. Based on such status data, the other separator may adjust its motor power or motor rpm, e.g. so as to achieve a predetermined overall system power, which may be lower than a sum of the separators' maximum powers.

It is understood, that in the embodiments discussed with respect to FIG. 2, the separators 1a, 1b may communicate with each other only. Hence, this embodiment can be used independently of the floor grinder 2.

Figure 3:
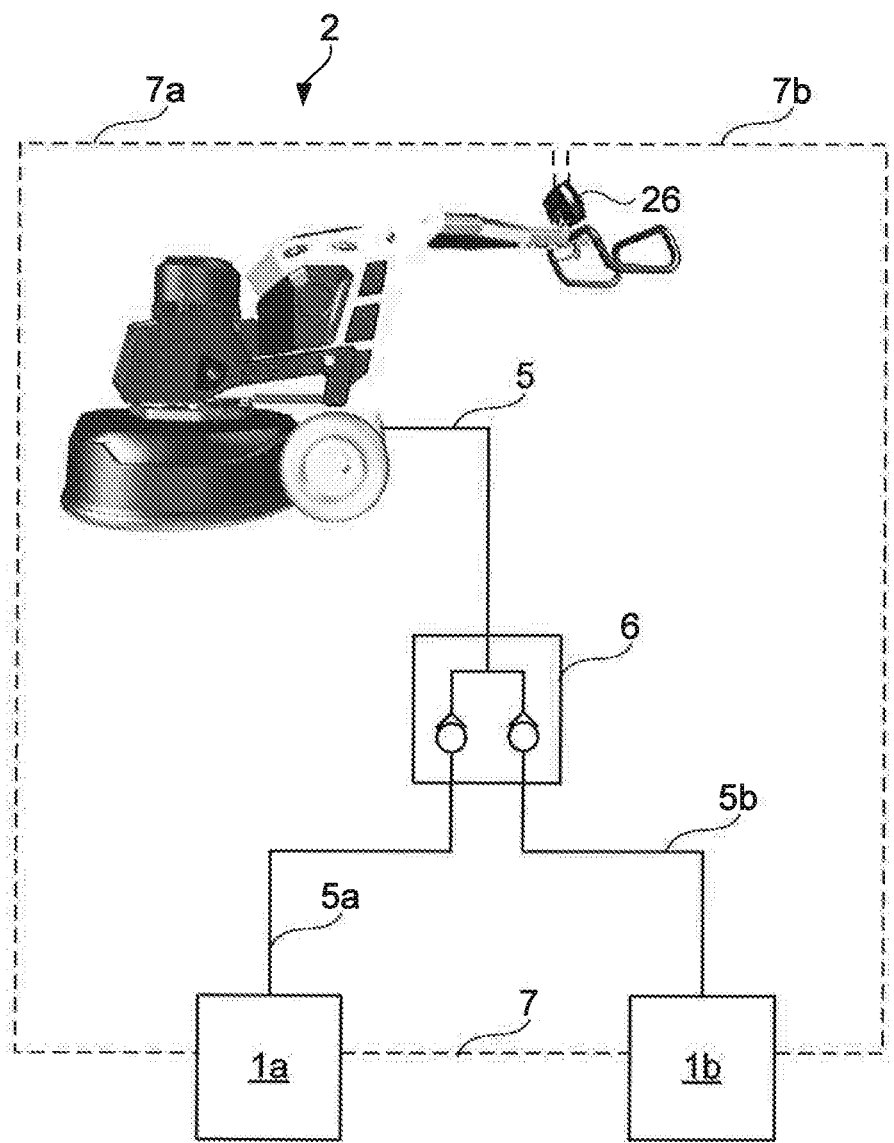
FIG. 3 is a schematic diagram illustrating another version of a system comprising a source of dust 2 and a pair of separators 1a, 1b.

Referring to FIG. 3, there is disclosed another group of embodiments, which differs from the embodiment discussed with reference to FIG. 2 in that the separators communicate with a central controller 26 instead of only with each other. Communication links 7a, 7b may thus be established between the communication devices 19 of the separators 1a, 1b and the central controller 26.

Hence, the separators 1a, 1b may send status data via their respective communication devices 19 to the central controller 26

Status data may be presented to the operator of the system, as individual data for the respective separator or as compound data (i.e. the separators are treated as if they were a single separator.

Control data may be sent from the central controller to the separators 1a, 1b via the communication links 7a, 7b.

For example, the decision to allow or to block a separator to initiate maintenance may be made by the central controller.

In the alternative, the central controller 26 may effectively forward status data from one of the separators 1a to the other one 1b, whereby the actual decision may be taken by the separator itself.

In addition, and optionally, a direct communication link 7 between the separators 1a, 1b may be established also in this case. Hence, data may be exchanged between the separators 1a, 1b, as described with reference to FIG. 2, while status data to be presented to the operator is received by the central controller 26 and selectively presented to the operator.

The central controller 26 may also provide control commands to the separators 1a, 1b, e.g. commands for turning the separators on or off; commands for setting a predetermined suction power or commands for overriding a maintenance request (which may be desirable if a grinding operation is almost finished when the maintenance need is identified).

The central controller 26 may be a controller which is integrated with the floor grinding machine, or it may be a separate device, which may be portable and intended to be carried by the user. This device may be integrated with a remote control device for controlling the floor grinding machine 2, or it may be a separate device.

As yet another option, the central controller may be one of the separator controllers 18. Hence, the separator controllers may be configured to operate in a master-slave relationship.

As noted with reference to FIG. 2, there need not be any central controller at all, merely the controllers 18 of the separators. In such case, a controller 26 forming part of the floor grinding machine 2 may be configured to merely receive status data from the separators 1a, 1b and to display such status data to the operator.

Figure 4:
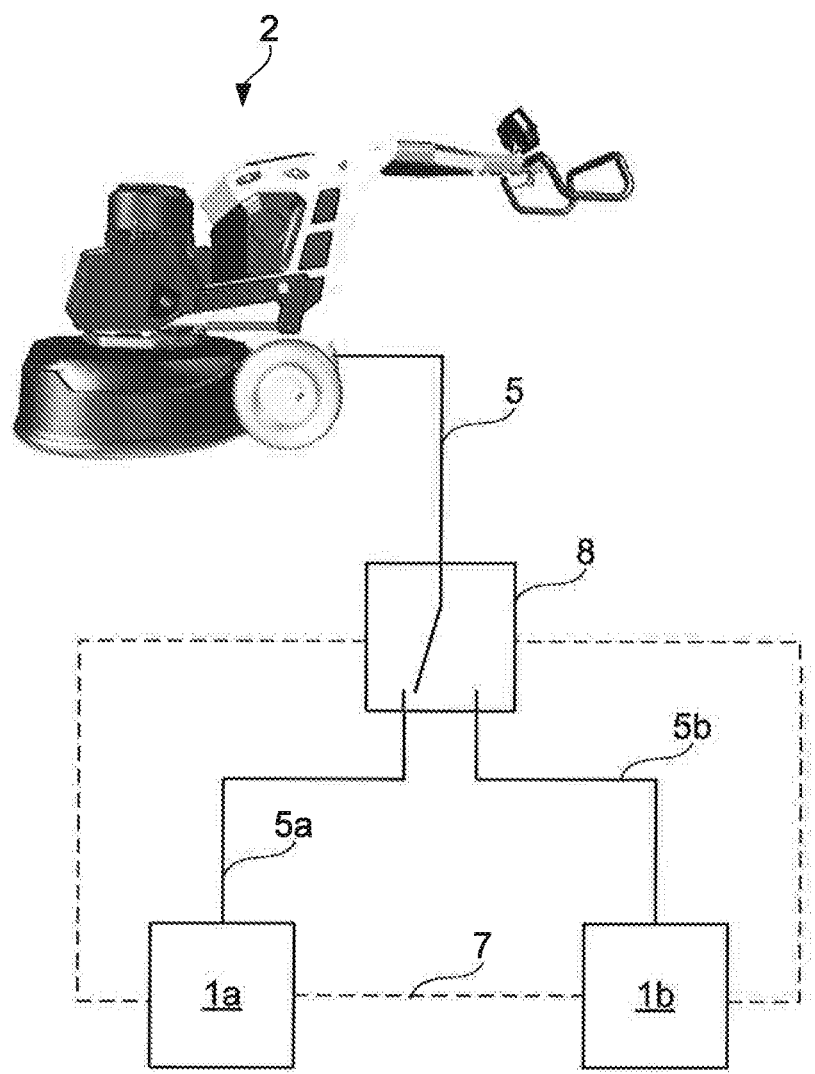
FIG. 4 is a schematic diagram illustrating another version of a system comprising a source of dust 2 and a pair of separators 1a, 1b.

Referring to FIG. 4, there is illustrated a system corresponding to that of FIG. 2, but wherein the junction from the first channel 5 to the two channels 5a, 5b is provided by a controllable junction switch 8. Such a controllable junction switch may comprise a valve body which allows for one or both of the channels 5a, 5b to be connected to the first channel 5. The valve body's movement may be provided by an actuator, which may be controlled by a junction controller comprising a communication device that may communicate with the communication device of at least one of the separators 1a, 1b, or of the central controller 26 (FIG. 3).

Hence, the junction switch 8 may be controlled by one or both of the separators, such that airflow through the channels 5, 5a, 5b can be selectively controlled to one or both of the separators 1a, 1b.

It is noted that the embodiment disclosed in FIG. 4 may be combined with that in FIG. 3, e.g. in that the junction switch may be controlled by the central controller 26.

While the junction devices 6 described herein are illustrated as 1:2 junctions, it is understood that the same principles may be used to provide a system with more than two separators, e.g. a 1:3, 1:4 or 1:5 system.

It is also possible to provide for multiple floor grinders 2, whereby a 2:2, 2:3 or 2:4 system may be provided.

As further options, three or more floor grinders may be connected, whereby a 3:1, 3:2, 3:3; 3:4 or 3:5 system may be provided.

It is understood, that a separator 1, 1a, 1b as disclosed herein, may communicate with only another separator or with at least two other separators.

It is also understood that a separator 1, 1a, 1b as disclosed herein may communicate only with a central controller 26.

It is also understood that a separator 1, 1a, 1b as disclosed herein may communicate with another separator or with at least two other separators, and with a central controller 26.

It is understood that the sensors 16a, 16b, 16c, 16d, 19 can be absolute pressure sensors, configured to measure an absolute pressure at each point, while such absolute pressures may then be either evaluated over time or compared with each other, as described above.

As an alternative, it is possible to use differential pressure measurements, e.g. by comparison between e.g. one sensor arranged in the flow path and another one arranged outside the flow path, or by comparison between sensors arranged on different sides of a separation unit 11, 12, 13.

The invention claimed is:

1. A separator for separating particles from a particle-laden airflow, the separator comprising:
   an inlet configured to receive the particle-laden airflow;
   a separation unit through which the particle laden air flow passes;
   a motor configured to draw the particle-laden airflow from the inlet and through the separation unit;
   a first separation unit status sensor and a second separation unit status sensor, the separation unit being disposed between the first separation unit status sensor and the second separation unit status sensor;
   a controller operatively connected to the motor and to the first separation unit status sensor and the second separation unit status sensor; and
   a communication device operatively connected to the controller, the communication device being configured to communicate with at least one unit external to the separator;
   wherein the controller is configured to:
     receive sensor data from the first separation unit status sensor and the second separation unit status sensor;
     determine, based on the sensor data, first separator status data indicative of a pressure drop across or an airflow through the separation unit;
     receive second separator status data indicating a pressure drop across or airflow through a second separation unit configured to selectively receive the particle-laden airflow;

determine a maintenance initiation condition for the separator based on the first separator status data and the second separator status data;

generate junction valve control data based on the sensor data; and send, via the communication device, the junction control data to an airflow junction valve controller to control an airflow junction valve to direct the particle-laden airflow to the separator or a second separator comprising the second separation unit.

2. The separator as claimed in claim 1, further comprising a frame configured to support the separation unit, the motor, and the controller.

3. A separator for separating particles from a particle-laden airflow, the separator comprising:

an inlet configured to receive the particle-laden airflow;

a separation unit through which the particle laden air flow passes;

a motor configured to draw the particle-laden airflow from the inlet and through the separation unit;

a first separation unit status sensor and a second separation unit status sensor, the separation unit being disposed between the first separation unit status sensor and the second separation unit status sensor;

a controller operatively connected to the motor and to the first separation unit status sensor and the second separation unit status sensor; and a communication device operatively connected to the controller, the communication device being configured to communicate with at least one unit external to the separator;

wherein the controller is configured to:

receive a first separation unit status signal from the first separation unit status sensor;

receive a second separation unit status signal from the second separation unit status sensor;

derive separator status data based on the first separation unit status signal and the second separation unit status signal;

communicate, via the communication device, the separator status data to the external unit;

receive, via the communication device, incoming control data from the external unit;

receive second separator status data indicating a pressure drop across or airflow through a second separation unit configured to selectively receive the particle-laden airflow;

determine, based on the separator status data, the second separator status data, and the incoming control data, whether to initiate separating unit maintenance on the separator;

in response to determining whether to initiate separating unit maintenance, selectively initiate separating unit maintenance on the separator;

generate junction valve control data based on the sensor data; and send, via the communication device, the junction control data to an airflow junction valve controller to control an airflow junction valve to direct the particle-laden airflow to the separator or a second separator comprising the second separation unit.

4. The separator as claimed in claim 3, wherein the separator status data comprises one of:

an indication that separating unit maintenance is imminent, an indication that separating unit maintenance is in progress, and an indication that no separating unit maintenance is imminent.

5. The separator as claimed in claim 3, wherein the incoming control data comprises an indication that the separator is allowed to initiate separating unit maintenance.

6. The separator as claimed in claim 3, wherein the controller is further configured to receive motor status data; wherein the separator status data comprises the motor status data.

7. The separator as claimed in claim 3, wherein the incoming control data comprises motor status data for a second separator comprising the second separation unit; and wherein the controller is further configured to control the motor based on the motor status data for the second separator.

8. A separator for separating particles from a particle-laden airflow, the separator comprising:

an inlet configured to receive the particle-laden airflow;

a separation unit through which the particle laden air flow passes;

a motor configured to draw the particle-laden airflow from the inlet and through the separation unit;

a first separation unit status sensor and a second separation unit status sensor, the separation unit being disposed between the first separation unit status sensor and the second separation unit status sensor;

a controller operatively connected to the motor and to the separation unit status sensor and the second separation unit status sensor; and a communication device operatively connected to the controller, the communication device being configured to communicate with at least one unit external to the separator;

wherein the controller is configured to:

receive sensor data from the first separation unit status sensor and the second separation unit status sensor; and control the motor of the separator based on the sensor data and second motor status data for a second motor of a second separator received from the second separator via the communication device;

determine, based on the sensor data, first separator status data indicative of a pressure drop across or an airflow through the separation unit;

receive second separator status data indicating a pressure drop across or airflow through a second separation unit configured to selectively receive the particle-laden airflow;

determine a maintenance initiation condition for the separator based on the first separator status data and the second separator status data;

generate junction valve control data based on the sensor data; and send, via the communication device, the junction control data to an airflow junction valve controller to control an airflow junction valve to direct the particle-laden airflow to the separator or a second separator comprising the second separation unit.

* * * * *